Sept. 4, 1923.
H. H. WALKER ET AL
POULTRY FEEDER
Filed Sept. 19, 1922      2 Sheets-Sheet 2
1,466,864
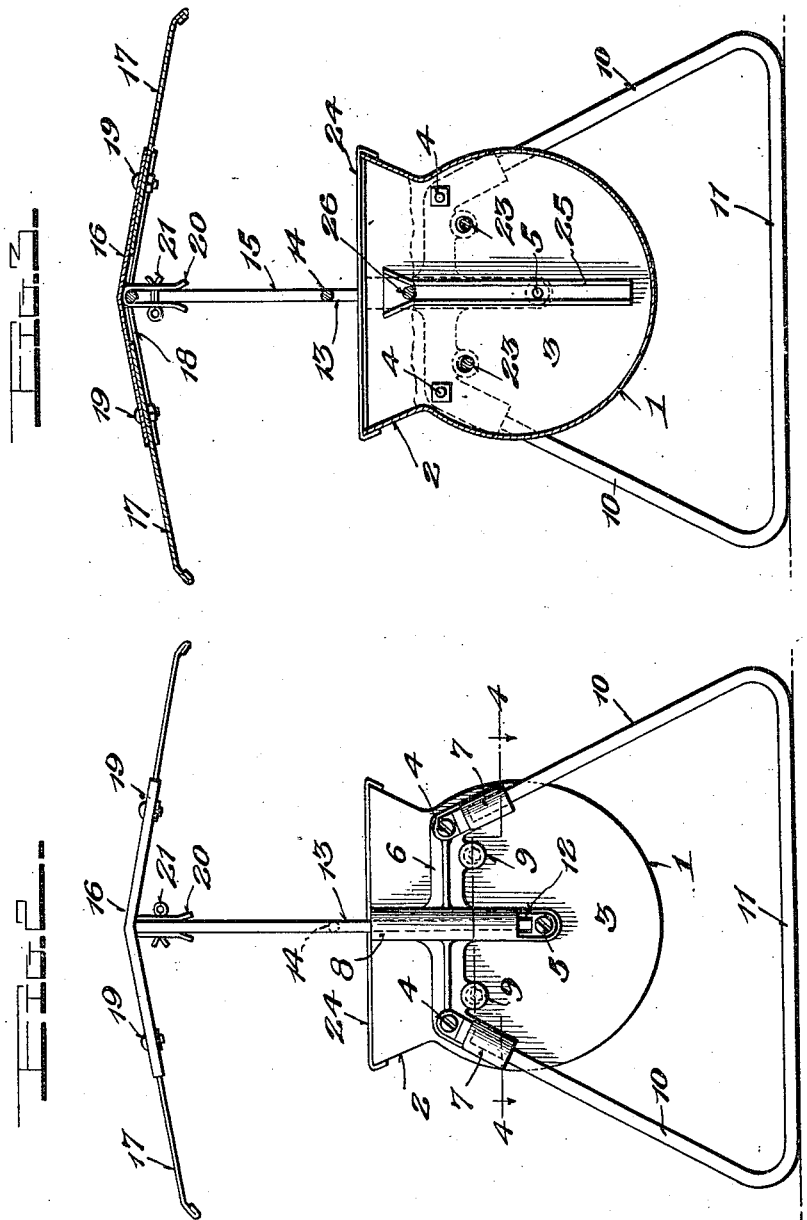
Inventors
H.H. Walker.
F. Enos Jr.
By 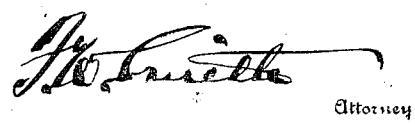
Attorney Patented Sept. 4, 1923.

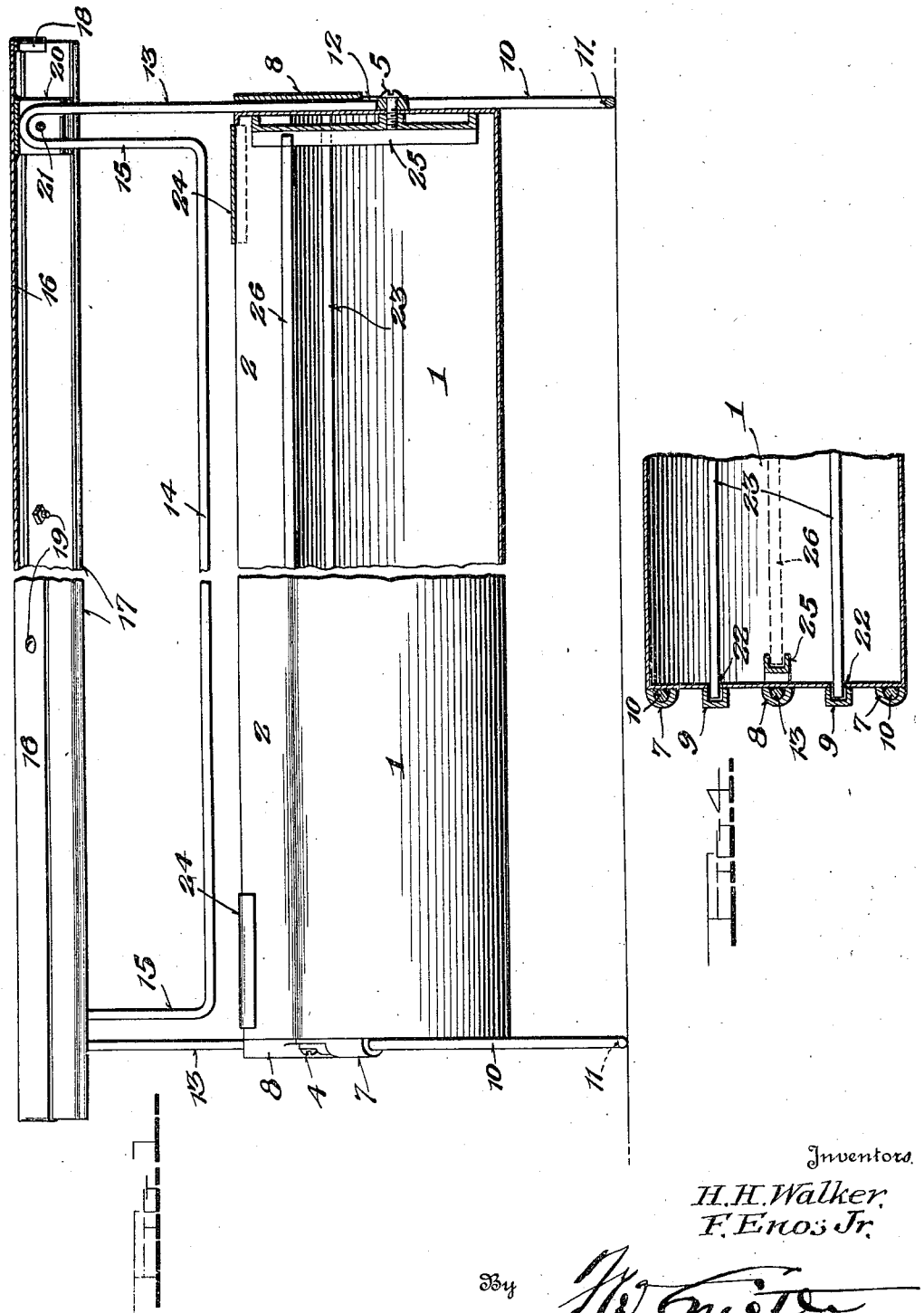

1,466,864

UNITED STATES PATENT OFFICE.

HARRY H. WALKER AND FRANK ENOS, JR., OF NEW LONDON, CONNECTICUT, ASSIGNORS TO THE NORWICH AUTOMATIC FEEDER COMPANY, OF NEW LONDON, CONNECTICUT, A CORPORATION OF CONNECTICUT.

POULTRY FEEDER.

Application filed September 19, 1922. Serial No. 589,074.

*To all whom it may concern:*

Be it known that we, HARRY H. WALKER and FRANK ENOS, Jr., both citizens of the United States, and residing at the city of New London, in the county of New London and State of Connecticut, have invented certain new and useful Improvements in Poultry Feeders; and we do declare the following to be a full, clear, and exact description of the invention, such as will enable others skilled in the art to which it appertains to make and use the same.

This invention relates to certain new and useful improvements in a poultry feeder and it has for one of its objects to provide novel end structures for supporting the feed trough and the protecting roof therefor, as well as the feed agitating means hereinafter referred to more specifically.

A further object of the invention is to provide improved means for agitating the feed whereby the same will be maintained in a loose state and prevented from working upwardly over the side walls of the trough.

A still further object is to provide improved roofing construction and means for supporting the same above the feed trough.

The invention also resides in guard means for exposing to the poultry predetermined portions of the vibrator means employed to agitate the feed, whereby the most efficient functioning of the latter may be obtained.

The invention further resides in the salient features of construction and the arrangements and combinations of parts hereinafter described and claimed, reference being had to the accompanying drawings, wherein:

Figure 1, is a side view of the improved poultry feeder, a part being shown in elevation and the remainder in longitudinal vertical section;

Figure 2, is an end elevation of the feeder;

Figure 3, is a vertical transverse section thereof; and

Figure 4, is a fragmentary, irregular section taking about on line 4—4 of Figure 2.

Referring more in detail to the accompanying drawings, the numeral 1 designates the feed trough which is substantially cylindrical and has an open top defined by flared walls 2 which function to prevent the poultry from scattering the feed or mash by providing greater facility for feeding and for catching the mash that drops from the bills of the chickens. The ends of the trough are closed by end walls 3 to the exterior of which are secured, as by fasteners 4 and 5 castings or cheek pieces 6. Each cheek piece, in its present embodiment, consists of a horizontal body portion having terminal sockets 7, which extend downwardly and incline outwardly from each other, an upright socket 8 disposed centrally between the sockets 7, and sockets 9 each disposed between the upright socket 8 and a respective socket 7.

The downwardly opening and relatively divergent sockets 7 are designed to receive the upwardly converging legs 10 integrally connected by the supporting base 11, said legs and base being preferably formed from a single length of spring wire or rod so that the legs may readily be sprung apart to facilitate the introduction or insertion of their upper ends into the sockets 7. In this manner the legs are securely held in place through the inherent resiliency of said supports 10, 11.

The upright sockets 8 have their lower ends provided with escape openings 12 through which any scattered mash or foreign matter may readily pass so that the socket chambers will not become clogged but always remain clean for the reception of the roof supporting posts 13. These posts or post sections constitute terminals of a wire guard 14 which functions in a like capacity to the guard described and claimed in Patent No. 1,138,365, issued May 4, 1915. This guard extends lengthwise of the trough, and above the same, to prevent the poultry from entering the trough, the ends being shaped to provide upstanding roof supports 15 which may be considered as being of inverted U-shape with the outer legs constituting the posts 13.

The roof consists of a central peak section and two side or shed sections 17 secured on opposite sides to the peak section 16. The roof is of the knock-down type to facilitate shipment thereof and for this cause the ends of the peak section are turned under to form flanges 18, the latter defining with the body portion of the peak section channels into which the ends of the shed portions of sections are slid to bring the pairs of openings provided in said sections into registry for receiving the screw bolts 19. These fasteners secure the several sections of the roof together and may be further assisted by hammering the flanges 18 tightly down against the shed portions to make a firmer structure. Spring clips 20 are secured to the under side of the peak portion for being snapped over the supports 15, following which cotter pins 21 are passed through the opposite sides of said clips to make the connections between the roof and the supports 15 positive.

The sockets 9 have their outer ends closed and their inner ends opening through apertures 22, in the end walls of the trough, so that the ends of the vibrator rod 23 may be inserted in said sockets for substantial support. These vibrator rods are loosely supported by said sockets 9 so as to be easily vibrated and set in motion upon the striking of the same by a fowl with its bill. To obtain a most efficient action by the vibrator rods it is desirable to have the poultry contact with the rods at a distance from their mounting in sockets 9. To this end guards 24 are placed over the end portions of said rods, said guards consisting of plates seated on the flared walls 2 and having their ends turned downwardly to slidably interlock therewith. Thus, adjustment of the guards is obtainable.

Secured to the inner surface of each end wall 3 is an upright channel member 25, formed of sheet metal or as a casting, the same being secured in position by the screw 5 so that the latter not only assists in securing the cheek pieces to the end walls but also the inner, channel members 25. The channels extend vertically and are open at both ends to prevent lodgement of the mash therein, the upper end being flared to facilitate the introduction of the ends of a rod 26 therein. This rod is designed to prevent the chickens from throwing the mash with their bills backwardly and out of the trough, it being well known that poultry have a habit of pawing over their food with their bills and throwing the feed back which not only causes waste but also unsanitary conditions. With the rod 26, the poultry will hit the same with its bill and soon learn to stop pawing the feed. This rod additionally acts as a vibrator to assist the vibrator rods 23 in thoroughly agitating the mash so that it will be loose and flow downwardly rather than bank up at the sides of the trough. This rod is placed within the channels to lie loosely on top of the dry mash and follows the latter as the level lowers by constant feeding.

The vibrator rods will function whether the mash covers the same or not since when the mash is below the level of these rods vibration will be set up in the walls of the trough, this action being practically constant due to the feeding movements of the poultry. The feeder is especially designed for chickens upwards of ten weeks of age, though obviously smaller embodiments could be provided for younger chicks. The cheek plate sockets are always clean, the socket 8 being kept clean by reason of the drain opening 12 while the sockets 9 have the feed constantly shaken out of them by the vibrator rods. These cheek plates or pieces practically constitute the sole mountings for the leg 10, the top and the vibrator rod so that they serve as excellent reinforcements for the end walls of the trough. The parts are easily dismantled for shipment or storage and can readily be set up without any trouble. The roof, being made in section, can be made much larger and thereby better protect the trough against rain.

What is claimed is:

1. A poultry feeder comprising a trough having a flared top, vibrator rods arranged within the trough, guard plates slidably interlocked with the flared top to house the mountings of the rods.

2. A poultry feeder comprising a trough having end walls, a cheek piece secured exteriorly to each end wall and having downwardly and outwardly inclined sockets, and a support for each cheek piece formed from a single length of wire bent to afford a broad base and upwardly and inwardly inclined legs removably sprung into the sockets.

3. A poultry feeder comprising a trough having end walls, a cheek piece secured exteriorly to each end wall and having downwardly and outwardly inclined sockets, and supporting legs fitting in the sockets and interconnected against accidental displacement.

4. A poultry feeder comprising a trough having end walls, a cheek piece secured exteriorly to each end wall and having downwardly and outwardly inclined sockets, and an intermediate upright socket opening at its upper and lower ends, said cheek piece also being formed with outwardly closed sockets opening into the trough through apertures in the adjacent end wall thereof, supporting legs engaged in the inclined sockets, roof supporting means engaged in the upright sockets, and vibrator rods arranged within the trough with their ends engaged in the inwardly opening sockets.

5. A poultry feeder comprising a trough having end walls, a cheek piece secured exteriorly to each end wall and having downwardly and outwardly inclined sockets, and an intermediate upright socket opening at its upper and lower ends, said cheek piece also being formed with outwardly closed sockets opening into the trough through apertures in the adjacent end wall thereof, supporting legs engaged in the inclined sockets, roof supporting means engaged in the upright sockets, vibrator rods supported in the inwardly opening sockets within the trough, a channel member secured to each inner end wall of the trough between the rods, and a guard rod having its ends slidably engaged in the channel members.

6. A poultry feeder comprising a trough having end walls, a cheek piece secured exteriorly to each end wall and having downwardly and outwardly inclined sockets, and an intermediate upright socket opening at its upper and lower ends, said cheek piece also being formed with outwardly closed sockets opening into the trough through apertures in the adjacent end wall thereof, supporting legs engaged in the inclined sockets, roof supporting means engaged in the upright sockets, vibrator rods supported in the inwardly opening sockets within the trough, and guard plates engaged with the trough adjacent the end walls thereof.

7. A poultry feeder comprising a trough, cheek pieces secured to the ends thereof, supporting means for the trough detachably engaged with the cheek pieces, and vibrating means arranged within the trough and supported by the cheek pieces.

8. A poultry feeder comprising a trough, cheek pieces secured to the ends thereof, supporting means for the trough detachably engaged with the cheek pieces, channel members secured within the trough, and gravitating vibrating means engaged in the channel members.

9. A poultry feeder comprising a trough, cheek pieces secured transversely across the ends thereof and provided with downturned terminal sockets, and a substantially triangular support for each end of the trough having the converging legs engaged in the sockets by a springing action.

10. A poultry feeder comprising a trough, cheek pieces on the exterior of the end walls, channel members on the inner side of the end walls, a common means of securement for said channel members and cheek pieces, supporting means engaged with the cheek pieces, and a rod having its ends slidably engaged in the channel members.

11. A poultry feeder comprising a trough, vibratory means extending lengthwise thereof and mounted at its ends whereby the intermediate portions will be vibrated by the poultry striking thereagainst, and guards for the end mountings of said means.

In testimony whereof we affix our signatures hereto.

HARRY H. WALKER.
FRANK ENOS, Jr.